Nov. 4, 1924.  1,514,504

H. COHEN

STEAM ENGINE

Filed Sept. 27, 1921

Harry Cohen Inventor

Patented Nov. 4, 1924.

1,514,504

UNITED STATES PATENT OFFICE.

HARRY COHEN, OF WASHINGTON, DISTRICT OF COLUMBIA.

STEAM ENGINE.

Application filed September 27, 1921. Serial No. 503,574.

*To all whom it may concern:*

Be it known that I, HARRY COHEN, citizen of the United States, residing at Washington, District of Columbia, have invented certain new and useful Improvements in Steam Engines, of which the following is a specification.

My invention relates to steam engines, and particularly to that class thereof known as uni-flow engines and consists in providing an auxiliary clearance chamber and certain mechanism connected therewith whereby the compression pressure may be automatically controlled, whereby a very smooth running engine is obtained, whereby fluid pressure may be advantageously made use of at any desired period of the working stroke of the piston and whereby other advantages hereinafter described are obtained.

While I have shown and will describe a double acting uni-flow engine, and while my invention is particularly directed to uni-flow engines, it is to be understood that my invention is applicable to single acting uni-flow engines and to all engines of the expansible chamber type.

For a complete understanding of my invention reference is to be had to the following description and to the accompanying drawings in which:—

Figure 1:
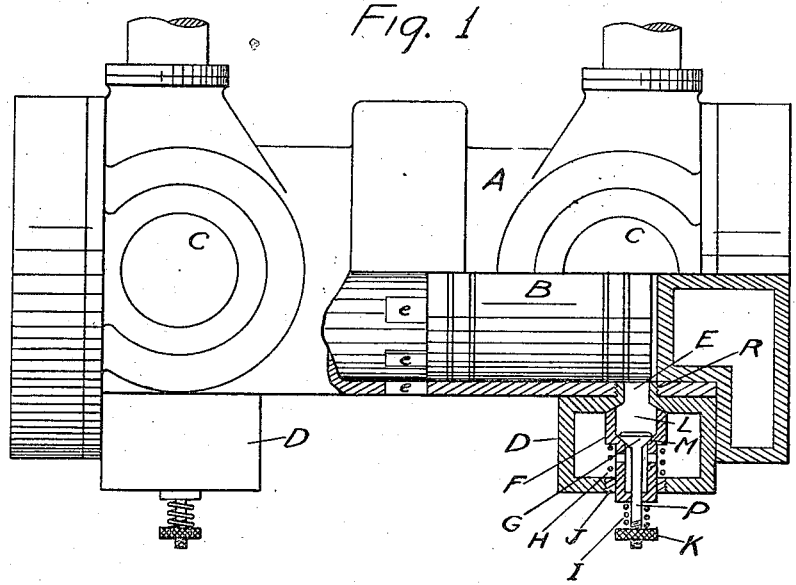
Fig. 1 is a plan view partially in elevation and partially in section of a double acting uni-flow engine showing my invention detachably connected thereto.

In the drawings A indicates an engine cylinder, having the usual piston B, the inlet valve housings C which are at the ends of the cylinder and which communicate with the interior of the cylinder in the usual way (not shown) and central piston controlled exhaust ports *e*. At the ends of the cylinder I provide the auxiliary clearance chambers D each of which communicates with the interior of the cylinder by means of an opening E controlled by valves F and G, spring pressed by the compression springs H and I, the tension of which may be regulated by the screw ring J and the nut K, respectively. The valve F is of tubular construction and is adapted to slide with a fluid tight fit, which may be obtained by the use of packing (not shown), if necessary, through a central opening in the screw ring J and the interior channel L of this tubular valve F is enlarged or counterbored as shown and is constructed to provide a seat M for the valve G which controls the passage of fluid from the chamber D through the openings O in the tubular valve F to the enlarged part of the channel L and thence to the cylinder of the engine. The stem P of the valve G passes slidably through an opening in the end wall of the tubular valve F and may be provided with any packing (not shown) to make a fluid tight fit.

Figure 2:
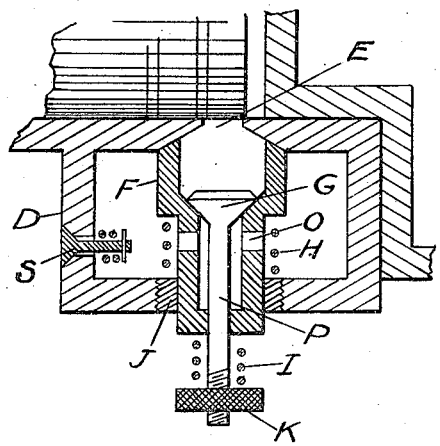
Fig. 2 is a partial sectional view of the engine showing the auxiliary chamber integral with the engine.

As shown by Fig. 1, the clearance chamber D is preferably detachably connected to the cylinder by means of a threaded nipple R. This detachable feature of my invention is important as it permits the application of my invention to engines already built. In the case of engines designed to have my invention installed thereon the chamber D may be detachably connected or it may be cast integral with the cylinder as shown by Fig. 2. The opening into which the screw ring J is threaded is larger than the diameter of the valve F so that the same may be readily withdrawn and inserted for any purpose desired. The clearance chambers D are provided with a safety valve S of any of the well known types.

The operation of my invention will be easily understood. The springs H and I will be tensioned so as to permit the opening and closing of the valves G and F at any desired pressures. When the pressure in the cylinder is sufficient to overcome the tension of the spring H the valve F will open and admit fluid to the clearance D and when the pressure in the cylinder falls below a certain point the spring H will close communication between the cylinder and the chamber D, the valve G meanwhile remaining seated, and when the pressure in the cylinder falls below the pressure in the clearance chamber so that the clearance chamber pressure is sufficient to overcome the cylinder pressure and the tension of the spring I, the valve G will open and fluid will pass from the clearance chamber D through the openings O in the tubular valve F through the valve channel past the valve and into the cylinder to aid the piston on its working stroke.

Figure 3:
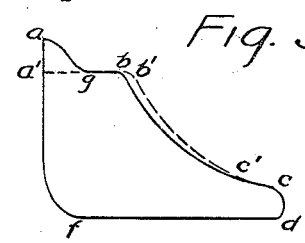
Fig. 3 is an indicator card, the full lines showing the pressure-volume conditions of an engine operating without my invention and the dotted lines showing the pressure-volume conditions of an engine operating with my inventions installed thereon.
Figure 4:
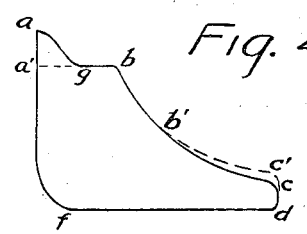
Fig. 4 is similar to Fig. 3 but shows the pressure-volume conditions of the engine when my device is regulated to admit the fluid pressure from the clearance chamber during a different period of the working stroke of the piston.

Referring to Figs. 3 and 4 which show, conventionally, pressure-volume conditions in an engine, the line $dfa$ represents the compression curve and shows the compression pressure to be above the normal admission pressure represented by the line $a'b$, the line $agb$ shows the unconstant admission pressure, the line $bc$ represents the expansion period and the line $cd$ shows release. When my invention is used with the engine, the compression pressure is controlled so that it will not, unless so desired for some reason, run above the pre-determined admission pressure, because any increase of the pressure above such predetermined pressure will force the valve F open and the fluid will flow into the clearance chamber D and will there remain until the piston reaches a predetermined point in its working stroke or until the cylinder pressure drops sufficiently when the valve G will open, as previously described, to permit the fluid in the chamber D to pass into the cylinder to assist the piston on its working stroke. Fig. 3 shows, by the line $b'c'$, the admission of the steam from the clearance chamber D to the cylinder almost immediately after cut-off and the consequent drop in pressure due to the expansion of the cylinder chamber and shows the use of the surplus compression pressure in an even and more advantageous manner than has heretofore been accomplished. Fig. 4 shows the admission of the steam from the chamber D to the cylinder by the line $c'c$ at a later period in the working stroke of the piston.

It is, of course, understood that the point at which the fluid is admitted from the clearance chamber to the cylinder chamber is controlled by regulating the spring I by the convenient means K. It will also be understood that should the admission pressure, for any reason, rise above a predetermined value, the valve F will open and permit the fluid of excess pressure to enter the clearance chamber thus preventing a pressure too high or uneven in the cylinder, and later the fluid so admitted will open the valve G and enter the cylinder to aid the piston. It will thus be seen that I have provided a device that will prevent abnormal and uneven pressure conditions and will make possible the use of surplus fluid pressure in a manner that will increase the thermal, mechanical and operating efficiencies of the engines to which my invention is applied.

As shown by the drawing my device is more or less diagrammatically represented and it will be understood that certain changes in the design and construction of the parts may be made without departing from the scope of my invention as defined by the appended claims.

What I claim and desire to secure by Letters Patent of the United States is:

1. The combination with an engine, of an engine cylinder, a clearance chamber adapted for communication with said engine cylinder, means in said chamber for controlling the communication of said cylinder with said chamber and separate means for controlling the communication of said chamber with said cylinder when the first controlling means is in operative position to close communication between the cylinder and the clearance chamber.

2. The combination with an engine, of an engine cylinder, a clearance chamber adapted for communication therewith, a valve controlling the passage of fluid from said cylinder to said clearance chamber and a valve for controlling the passage of fluid from said clearance chamber to said cylinder.

3. The combination with an engine cylinder, a clearance chamber adapted for communication therewith, a valve responsive to pressure conditions in the cylinder for controlling the passage of steam from the cylinder to said chamber and a valve responsive to pressure conditions in the cylinder and the chamber for controlling the passage of steam from the chamber to the cylinder.

4. The combination as defined by claim 2 and means for regulating the operation of said valves.

5. The combination as defined by claim 3 and means for regulating the operation of said valves.

6. The combination of an engine, of an engine cylinder, a clearance chamber having communication therewith, a one-way valve controlling the communication of the said cylinder with the said chamber and another one-way valve controlling the passage of fluid from the said chamber to the said cylinder.

7. The combination as defined by claim 6 and means for controlling the operation of said valves.

8. The combination with a uni-flow engine, of an engine cylinder, a clearance chamber associated therewith, a tubular valve to control the passage of steam from said cylinder to said chamber, passages in said tubular valve and a valve seated in said tubular valve to control the passage of steam from the clearance chamber to said cylinder.

In testimony whereof I affix my signature.

HARRY COHEN.